United States Patent
Sakitani et al.

(10) Patent No.: US 12,155,064 B2
(45) Date of Patent: Nov. 26, 2024

(54) NONAQUEOUS ELECTROLYTE SECONDARY BATTERY

(71) Applicant: SANYO Electric Co., Ltd., Daito (JP)

(72) Inventors: Nobuhiro Sakitani, Tokushima (JP); Takaharu Morikawa, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 493 days.

(21) Appl. No.: 17/628,422

(22) PCT Filed: Jul. 20, 2020

(86) PCT No.: PCT/JP2020/028031
§ 371 (c)(1),
(2) Date: Jan. 19, 2022

(87) PCT Pub. No.: WO2021/015157
PCT Pub. Date: Jan. 28, 2021

(65) Prior Publication Data
US 2022/0271273 A1 Aug. 25, 2022

(30) Foreign Application Priority Data

Jul. 24, 2019 (JP) ................................. 2019-136301

(51) Int. Cl.
*H01M 4/36* (2006.01)
*H01M 4/62* (2006.01)
*H01M 4/02* (2006.01)

(52) U.S. Cl.
CPC ............ *H01M 4/364* (2013.01); *H01M 4/62* (2013.01); *H01M 2004/021* (2013.01); *H01M 2004/028* (2013.01)

(58) Field of Classification Search
CPC ...... H01M 4/364; H01M 4/366; H01M 4/362; H01M 4/62; H01M 4/621; H01M 4/624; H01M 4/661; H01M 4/64; H01M 2004/021; H01M 2004/028
See application file for complete search history.

(56) References Cited

U.S. PATENT DOCUMENTS

| | | | | |
|---|---|---|---|---|
| 9,490,462 | B2 * | 11/2016 | Teshima | ............ H01M 10/0587 |
| 9,583,769 | B2 * | 2/2017 | Ueki | ........ H01M 4/13 |
| 11,239,487 | B2 * | 2/2022 | Hoshiba | ............ H01M 10/0431 |
| 2009/0136848 | A1 | 5/2009 | Minami et al. | |
| 2013/0089771 | A1 | 4/2013 | Nishikawa | |
| 2017/0309953 | A1 | 10/2017 | Harayama et al. | |

FOREIGN PATENT DOCUMENTS

| | | |
|---|---|---|
| CN | 106797008 A | 5/2017 |
| JP | 10-64549 A | 3/1998 |
| JP | 2001-202965 A | 7/2001 |
| JP | 2002-329495 A | 11/2002 |
| JP | 2005-158627 A | 6/2005 |
| JP | 2007-280911 A | 10/2007 |
| JP | 2017-91701 A | 5/2017 |
| JP | 2018-125216 A | 8/2018 |
| KR | 20190054829 A | 5/2019 |
| WO | 2012/137376 A1 | 10/2012 |

OTHER PUBLICATIONS

International Search Report dated Oct. 6, 2020, issued in counterpart International Application No. PCT/JP2020/028031. (3 pages).
Office Action dated Oct. 28, 2023, issued in counterpart CN Application No. 202080052593.X, with partial English translation. (11 pages).
Extended European Search Report dated Mar. 15, 2023, issued in counterpart EP Application No. 20844763.1. (7 pages).

* cited by examiner

*Primary Examiner* — Raymond Alejandro
(74) *Attorney, Agent, or Firm* — WHDA, LLP

(57) ABSTRACT

A nonaqueous electrolyte secondary battery including an electrode body which comprises a positive electrode, a negative electrode and a separator that is arranged between the positive electrode and the negative electrode, while comprising a heat-resistant layer and a base material layer; and a nonaqueous electrolyte. The positive electrode having a positive electrode mixture layer containing a positive electrode active material and resin-coated particles obtained by coating metal-based particles with a resin that melts at a temperature from 100° C. to 150° C.; the metal-based particles contain at least either metal or metal compound particles, which are dissolved in the nonaqueous electrolyte at 4.3 V (vs. Li/Li$^+$) or less; the metal-based particles have an average particle diameter of more than 1 μm; the content of the resin-coated particles is 0.5%-10% by mass relative to the total amount of the positive electrode mixture layer; and the heat-resistant layer contains a filler and a binder.

4 Claims, 2 Drawing Sheets

NONAQUEOUS ELECTROLYTE SECONDARY BATTERY

TECHNICAL FIELD

The present disclosure relates to a non-aqueous electrolyte secondary battery.

BACKGROUND

Non-aqueous electrolyte secondary batteries that are charged or discharged when, for example, lithium ions move between positive and negative electrodes are widely used as high power and high energy density secondary batteries.

For example, Patent Document 1 discloses a non-aqueous electrolyte secondary battery in which a positive electrode containing a reducing agent including a material which reduces a positive electrode active material that is in a charged state at a temperature above 60° C. and which is coated with a resin that melts at a predetermined temperature above 60° C. is used. Patent Document 1 further discloses that the non-aqueous electrolyte secondary battery can ensure safety of the battery even when it is exposed to a high-temperature environment in a charged state.

CITATION LIST

Patent Literature

PATENT LITERATURE 1: International Publication No. WO 2012/137376

SUMMARY

Problem to be Solved by the Invention

In recent years, demands for ensuring higher safety arise in response to the increases in, for example, the capacity and energy density of non-aqueous electrolyte secondary batteries. To ensure higher safety, further improvements are needed in terms of suppressing an increase in battery temperature of a non-aqueous electrolyte secondary battery exposed to a high-temperature environment in a charged state.

In consideration of the above, the present disclosure is directed toward suppressing an increase in battery temperature of a non-aqueous electrolyte secondary battery exposed to a high-temperature environment in a charged state.

Solution to Problem

According to an aspect of the present disclosure, there is provided a non-aqueous electrolyte secondary battery comprising an electrode assembly comprising a positive electrode, a negative electrode, and a separator, the separator comprising a heat-resistant layer and a substrate layer that are disposed between the positive electrode and the negative electrode; and a non-aqueous electrolyte, wherein the positive electrode comprises a positive electrode mixture layer that contains a positive electrode active material and resin-coated particles including metal-based particles coated with a resin that melts at 100° C. to 150° C., wherein the metal-based particles comprise at least either of metal particles and metal compound particles that elute into the non-aqueous electrolyte at 4.3 V (vs. Li/Li$^+$) or less, wherein the metal-based particles have an average particle size of greater than 1 µm, and the content of the resin-coated particles is from 0.5% by mass to less than 10% by mass relative to the total amount of the positive electrode mixture layer, and wherein the heat-resistant layer contains a filler and a binder.

Advantages of the Invention

An aspect of the present disclosure enables suppressing an increase in battery temperature of a non-aqueous electrolyte secondary battery exposed to a high-temperature environment in a charged state.

DESCRIPTION OF EMBODIMENTS

Figure 1:
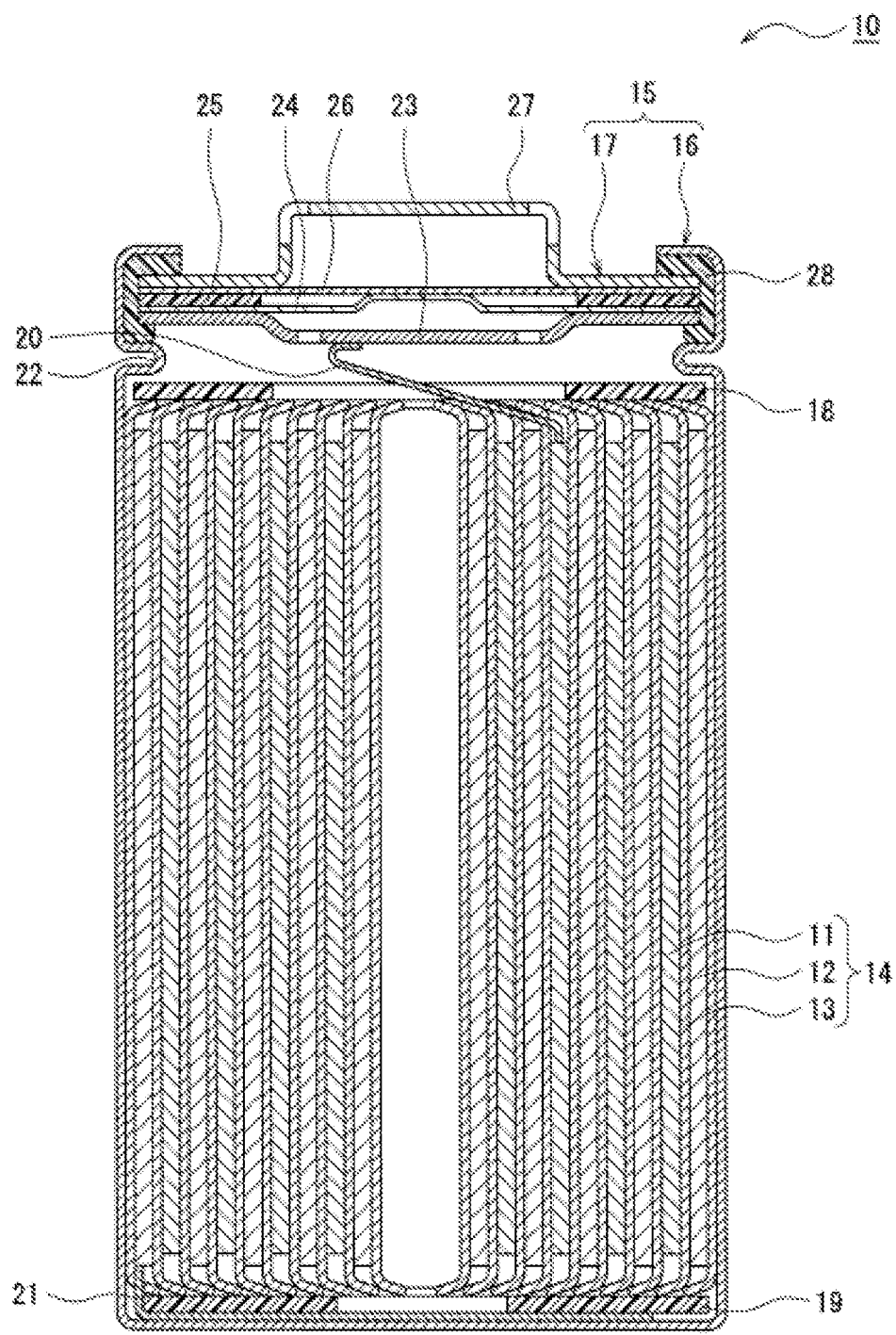
FIG. 1 is a cross-sectional view of a non-aqueous electrolyte secondary battery according to an example embodiment.

According to an aspect of the present disclosure, there is provided a non-aqueous electrolyte secondary battery comprising an electrode assembly comprising a positive electrode, a negative electrode, and a separator, the separator comprising a heat-resistant layer and a substrate layer that are disposed between the positive electrode and the negative electrode; and a non-aqueous electrolyte, wherein the positive electrode comprises a positive electrode mixture layer that contains a positive electrode active material and resin-coated particles including metal-based particles coated with a resin that melts at 100° C. to 150° C., wherein the metal-based particles comprise at least either of metal particles and metal compound particles that elute into the non-aqueous electrolyte at 4.3 V (vs. Li/Li$^+$) or less, wherein the metal-based particles have an average particle size of greater than 1 µm, and the content of the resin-coated particles is from 0.5% by mass to less than 10% by mass relative to the total amount of the positive electrode mixture layer, and wherein the heat-resistant layer contains a filler and a binder.

A non-aqueous electrolyte secondary battery according to an aspect of the present disclosure enables suppressing an increase in battery temperature that would occur when exposed to a high-temperature environment in a charged state. It is inferred that the mechanism behind this effect is as follows. When the battery disclosed herein is exposed to a high-temperature environment (for example, 100° C. or higher) in a charged state, the resin in the resin-coated particles melts, and the metal-based particles are exposed. The metal-based particles elute into the non-aqueous electrolyte at the potential of the positive electrode in the charged state and precipitate on the opposing negative electrode. Deposits that precipitate on the negative electrode grow, pass through the separator, and reach the positive electrode, causing micro-short circuits between the positive and negative electrodes. The micro-short circuits gradually lower the energy of the charged state battery and suppress an increase in battery temperature under a high-temperature environment.

If the separator does not include a heat-resistant layer, the separator melts due to a short circuit current that flows between the positive and negative electrodes when short circuiting occurs, resulting in a greater short circuit area between the positive and negative electrodes. As a result, because the short circuit current increases, the battery generates heat, and an increase in battery temperature cannot be suppressed sufficiently. In contrast, because the separator in the battery disclosed herein includes a heat-resistant layer, the melting of the separator due to a short circuit current that flows between the positive and negative electrodes when short circuiting occurs is suppressed, and the increase in the short circuit current is suppressed. In other words, the present disclosure is based on the idea of controlling the degree of short circuiting not only by establishing short circuits between the positive and negative electrodes using the resin-coated particles but also by combining them with the separator that includes a heat-resistant layer. This idea has heretofore been unknown and is remarkable.

Further, the present disclosure also controls the degree of short circuiting between the positive and negative electrodes by adjusting the elution potential and the average particle size of the metal-based particles and the content of the resin-coated particles. For example, metal-based particles that do not elute at 4.3 V (vs. $Li/Li^+$) or less are difficult to elute from the positive electrode even when the battery is exposed to a high-temperature environment in a charged state, and deposits are difficult to precipitate on the opposing negative electrode. As such, micro-short circuits are difficult to occur between the positive and negative electrodes. Further, for example, metal-based particles that are small particles with an average particle size of 1 μm or less do not allow deposits that precipitate on the negative electrode to grow to reach the positive electrode. As such, micro-short circuits are difficult to occur between the positive and negative electrodes. Further, for example, when the content of resin-coated particles is as low as 0.1% by mass, deposits that have precipitated on the negative electrode cause micro-short circuits between the positive and negative electrodes at few locations, hampering efficient short circuiting. Further, for example, when the content of resin-coated particles is as high as 10% by mass or higher, deposits that have precipitated on the negative electrode cause micro-short circuits between the positive and negative electrodes at too many locations, increasing the short circuit current. In any of these cases, the degree of short circuiting cannot be controlled, leading to an increase in battery temperature under a high-temperature environment.

An example embodiment of a non-aqueous electrolyte secondary battery according to the present disclosure will be described in detail below.

FIG. 1 is a cross-sectional view of a non-aqueous electrolyte secondary battery according to an example embodiment. The non-aqueous electrolyte secondary battery 10 illustrated in FIG. 1 includes a wound electrode assembly 14 in which a positive electrode 11 and a negative electrode 12 are wound with a separator 13 therebetween; a non-aqueous electrolyte; insulating plates 18 and 19 that are respectively disposed on upper and lower sides of the electrode assembly 14; and a battery case 15 that houses these components. The battery case 15 includes a case body 16 having a cylindrical shape with a closed bottom and a sealing structure 17 covering the opening of the case body 16. The wound electrode assembly 14 may be replaced with another form of electrode assembly, such as a laminated electrode assembly that includes positive electrodes and negative electrodes alternately laminated with a separator therebetween. Examples of the battery case 15 include a metal case having a cylindrical, rectangular, coin, button, or another shape and a resin case composed of a laminated resin sheet (laminated battery).

The case body 16 is, for example, a metal container having a cylindrical shape with a closed bottom. A gasket 28 is provided between the case body 16 and the sealing structure 17, thereby maintaining airtightness of the space inside the battery. The case body 16 has, for example, a protrusion 22, which is an inwardly protruding portion of the side surface of the case body 16 for supporting the sealing structure 17. The protrusion 22 preferably has an annular shape extending along the circumference of the case body 16, and supports the sealing structure 17 on its upper surface.

The sealing structure 17 has a configuration in which a filter 23, a lower valve element 24, an insulating member 25, an upper valve element 26, and a cap 27 are stacked in that order from the side on which the electrode assembly 14 is located. The components of the sealing structure 17 have, for example, either a disc shape or a ring shape and are, except for the insulating member 25, electrically connected to each other. The lower valve element 24 and the upper valve element 26 are connected to each other at their center portions, and the insulating member 25 is interposed between their peripheral portions. In response to an increase in internal pressure of the non-aqueous electrolyte secondary battery 10 due to heat generation caused by, for example, internal short circuits, for example, the lower valve element 24 breaks as it is deformed so as to push the upper valve element 26 toward the cap 27, resulting in an interruption of the current path between the lower valve element 24 and the upper valve element 26. In response to a further increase in internal pressure, the upper valve element 26 breaks, letting gas escape through an opening of the cap 27.

In the non-aqueous electrolyte secondary battery 10 illustrated in FIG. 1, a positive electrode lead 20 attached to the positive electrode 11 passes through a through hole in the insulating plate 18 and extends toward the sealing structure 17, and a negative electrode lead 21 attached to the negative electrode 12 passes outside the insulating plate 19 and extends toward the bottom of the case body 16. The positive electrode lead 20 is connected to an underside of the filter 23, which is the bottom plate of the sealing structure 17, by, for example, welding, and the cap 27, which is the top plate of the sealing structure 17 electrically connected to the filter 23, serves as a positive electrode terminal. The negative electrode lead 21 is connected to an inner surface of the bottom of the case body 16 by, for example, welding, and the case body 16 serves as a negative electrode terminal.

Figure 2:
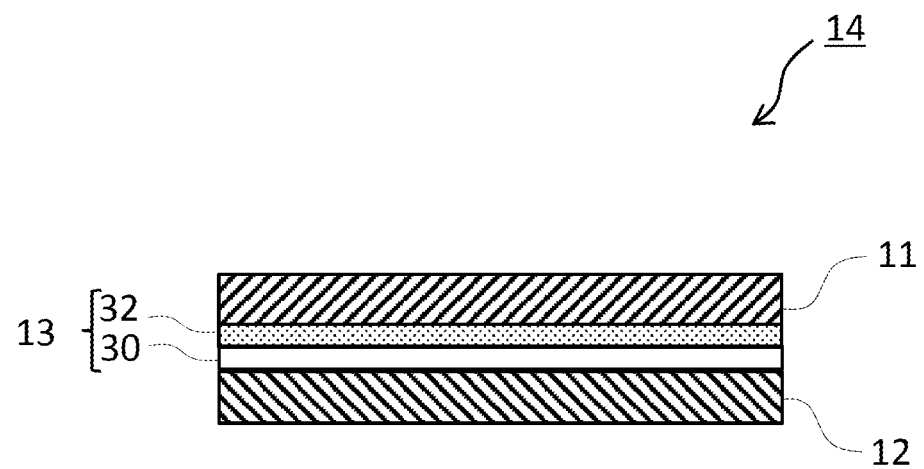
FIG. 2 is a partially enlarged cross-sectional view illustrating an example electrode assembly for use in the non-aqueous electrolyte secondary battery illustrated in FIG. 1.

FIG. 2 is a partially enlarged cross-sectional view illustrating an example electrode assembly for use in the non-aqueous electrolyte secondary battery illustrated in FIG. 1. The positive electrode, the negative electrode, and the separator will be described below with reference to FIG. 2.

Positive Electrode

The positive electrode 11 includes a positive electrode collector and a positive electrode mixture layer that is disposed on the collector. Examples of the positive electrode collector include foil of metal that is stable in a potential range of the positive electrode 11, such as aluminum, and a film having such metal disposed in its surface layer. The positive electrode mixture layer contains a positive electrode active material and resin-coated particles, and preferably further contains a conductive material and a binder. The positive electrode mixture layer is preferably formed on both sides of the positive electrode collector. The positive electrode 11 can be prepared by, for example, applying positive electrode mixture slurry containing, for example, a positive electrode active material, resin-coated particles, a conductive material, and a binder to the positive electrode collector, drying the coating, and then rolling it to form the positive electrode mixture layer on both sides of the positive electrode collector. To achieve an increased capacity of the battery, the positive electrode mixture layer preferably has a density of 3.6 g/cc or greater and more preferably has a density of from 3.6 g/cc to 4.0 g/cc.

Examples of the positive electrode active material include a lithium metal composite oxide containing one or more metal elements such as Co, Mn, Ni, or Al. Examples of the lithium metal composite oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (where M represents at least one of Na, Mg, Sc, Y, Mn, Fe, Co, Ni, Cu, Zn, Al, Cr, Pb, Sb, and B, and where $0.95 \le x \le 1.2$, $0.8 \le y < 0.95$, and $2.0 \le z \le 2.3$).

The resin-coated particles include metal-based particles and a resin layer that covers a surface of each of the metal-based particles. The resin layer contains a resin that melts at 100° C. to 150° C. The metal-based particles comprise at least either of metal particles and metal compound particles that elute at 4.3 V (vs. $Li/Li^+$) or less.

Examples of the metal particles and the metal compound particles that elute at 4.3 V (vs. $Li/Li^+$) or less include particles of Cu, Sn, $SnSO_4$, $SnCl_4$, Bi, $Bi_2(SO_4)_3$, $BiCl_3$, Zn, $ZnCl_2$, $ZnSO_4$, Co, $Ag_2O$, Pb, $PbCl_2$, Fe, and $Fe_2O_3$. Among these, Cu, Sn, and Zn are preferable as they, for example, elute rapidly and can cause micro-short circuits to occur early between the positive and negative electrodes.

The metal-based particles have an average particle size of greater than 1 μm to cause micro-short circuits between the positive and negative electrodes, preferably of from 5 μm to 50 μm, and more preferably of from 10 μm to 50 μm. It should be noted that, even when the average particle size is greater than 50 μm, micro-short circuits occur between the positive and negative electrodes. However, in that case, as the electrical resistance of the positive electrode increases, the performance of the battery during normal operation may drop. The average particle size of the metal-based particles represents a volume average particle size (Dv50) at which the volume total is 50% in a particle size distribution as measured using laser diffraction scattering.

The resin that melts at 100° C. to 150° C. is a resin having a melting point in a range of from 100° C. to 150° C., and examples of such a resin include polyimides, polyether ether ketones, polyamideimides, low density polyethylenes, ethylene-α-olefin copolymers, ethylene-vinyl acetate copolymers, ethylene-ethyl acrylate copolymers, ethylene-methyl acrylate copolymers, ethylene-glycidyl methacrylate copolymers, ethylene-acrylate copolymers, and ethylene-propylene copolymers. It is to be understood that the melting point of a resin can be changed depending on, for example, crystallinity, molecular weight, branching, or density.

If a resin that melts below 100° C. is used, the resin may melt during normal operation of the battery, so that the metal-based particles are exposed, causing micro-short circuits between the positive and negative electrodes. If a resin that melts at a temperature above 150° C. is used, the melting of the resin and the resulting elution of the metal-based particles in response to exposure of the battery to a high-temperature environment may occur with a delay, causing the battery to generate heat before micro-short circuits occur between the positive and negative electrodes.

To, for example, allow the metal-based particles to be exposed without delay in response to exposure of the battery to a high-temperature environment, the thickness of the resin that covers the metal-based particles (that is, the thickness of the coating layer) is preferably from 0.05 μm to 10 μm and more preferably from 0.1 μm to 8 μm.

The content of the resin-coated particles is from 0.5% by mass to 10% by mass relative to the total amount of the positive electrode mixture layer to cause micro-short circuits between the positive and negative electrodes, preferably in a range of from 1% by mass to 9% by mass, and more preferably in a range of from 2% by mass to 8% by mass.

The resin-coated particles may be prepared by any method that enables coating of the surfaces of the metal-based particles with a resin. For example, the resin-coated particles with the surfaces of the metal-based particles coated with a resin can be prepared by using, for example, a surface modification device to which a high-speed airflow impact method is applied, such as a hybridization system (from Nara Machinery Co., Ltd.), a Kryptron Cosmos system (from Kawasaki Heavy Industries, Ltd.), or an Inomizer system (from Hosokawa Micron Group), a surface modification device to which a dry mechanochemical method is applied, such as a mechanofusion system (from Hosokawa Micron Group) or a mechanomill (from Okada Seiko Co., Ltd.), or a surface modification device to which a wet coating method is applied, such as Dispercoat (from Nisshin Engineering Inc.) or Coatmizer (from Freund Corporation).

Examples of the conductive material contained in the positive electrode mixture layer include carbon materials such as carbon black, acetylene black, Ketjen black, graphite, carbon nanotubes, carbon nanofibers, and graphene. Examples of the binder contained in the positive electrode mixture layer include polytetrafluoroethylene (PTFE), polyvinylidene fluoride (PVdF), and other fluorine-containing resins, polyacrylonitrile (PAN), polyimides, acrylic resins, polyolefins, carboxymethyl cellulose (CMC) or salts thereof, styrene-butadiene rubber (SBR), polyacrylic acid (PAA) or salts thereof, polyvinyl alcohol (PVA), and polyethylene oxide (PEO).

Negative Electrode

The negative electrode 12 includes a negative electrode collector and a negative electrode mixture layer that is disposed on the collector. Examples of the negative electrode collector include foil of metal that is stable in a potential range of the negative electrode 12, such as copper, and a film having such metal disposed in its surface layer. The negative electrode mixture layer contains, for example, a negative electrode active material and a binder and is preferably formed on both sides of the negative electrode collector. The negative electrode 12 can be prepared by applying negative electrode mixture slurry containing, for example, a negative electrode active material and a binder on the negative electrode collector, drying the coating, and then rolling it to form the negative electrode mixture layer on both sides of the negative electrode collector.

The negative electrode active material is not particularly limited and may be any active material that can reversibly occlude and release lithium ions, and examples of such an active material include carbon materials such as natural graphite and artificial graphite, metals such as silicon (Si) and tin (Sn) that can be alloyed with Li, oxides containing one or more metal elements such as Si and Sn, and lithium titanium composite oxides. When a lithium titanium composite oxide is used, the negative electrode mixture layer preferably contains a conductive material such as carbon black. For the binder contained in the negative electrode mixture layer, a material that is similar to that used in the positive electrode 11 is used.

Separator

As illustrated in FIG. 2, the separator 13 includes a substrate layer 30 and a heat-resistant layer 32 that is disposed on the substrate layer 30. The heat-resistant layer 32 contains a filler and a binder.

The substrate layer 30 and the heat-resistant layer 32 illustrated in FIG. 2 are disposed between the positive electrode 11 and the negative electrode 12. The heat-resistant layer 32 is disposed on a surface of the substrate layer 30 that is opposed to the positive electrode 11. In other words, the heat-resistant layer 32 is disposed between the substrate layer 30 and the positive electrode 11. The manner in which the heat-resistant layer 32 is disposed is not limited to the above-described example, and the heat-resistant layer 32 may be disposed on, for example, a surface of the substrate layer 30 that is opposed to the negative electrode 12 (in other words, the heat-resistant layer 32 may be disposed between the substrate layer 30 and the negative electrode 12). Further, the heat-resistant layer 32 may be disposed on, for example, both sides of the substrate layer 30 (in other words, the heat-resistant layer 32 may be disposed between the substrate layer 30 and the positive electrode 11 and between the substrate layer 30 and the negative electrode 12). While it is preferable to form the heat-resistant layer 32 on the substrate layer 30 to be opposed to an electrode, the heat-resistant layer 32 may be formed on either the positive electrode 11 or the negative electrode 12 to be opposed to the substrate layer 30. In any case, the heat-resistant layer 32 and the substrate layer 30 are disposed between the positive electrode 11 and the negative electrode 12 when they are assembled into the electrode assembly 14.

The substrate layer 30 is composed of a porous sheet having ion permeability and insulating properties, such as a microporous thin film, woven fabric, or nonwoven fabric. Examples of the resin that forms the substrate layer 30 include polyethylene, polypropylene, copolymers of poly-ethylene and α-olefins and other polyolefins, acrylic resins, polystyrene, polyester, and cellulose. The substrate layer 30 is, for example, composed predominantly of a polyolefin and may be composed substantially of only a polyolefin. The substrate layer 30 may have either a single-layer structure or a laminated structure. The thickness of the substrate layer 30 is not particularly limited and is, for example, preferably from 3 μm to 20 μm.

In terms of, for example, ion permeability, the average pore size of the substrate layer 30 is, for example, preferably from 0.02 μm to 0.5 μm and more preferably from 0.03 μm to 0.3 μm. The average pore size of the substrate layer 30 is measured using a palm porometer (from Seika Corporation) that is capable of pore diameter measurement by the bubble point method (JIS K3832, ASTM F316-86).

The heat-resistant layer 32 is a component that suppresses melting of the substrate layer 30 with heat, and is disposed on the substrate layer 30. The filler contained in the heat-resistant layer 32 is composed of a material having a higher heat resistance than the material used for the substrate layer 30 and, in particular, is preferably composed of a material that is stably present at the working voltage of the non-aqueous electrolyte secondary battery. The property of being stably present at the working voltage of the non-aqueous electrolyte secondary battery indicates that it completely does not elute at the working voltage or does not elute to the extent that it degrades the function of the non-aqueous electrolyte secondary battery.

Examples of the filler include metal oxides such as aluminum oxide (alumina), magnesium oxide, titanium oxide, zirconium oxide, silicon oxide, yttrium oxide, and zinc oxide, metal nitrides such as silicon nitride, aluminum nitride, boron nitride, and titanium nitride, and metal carbides such as silicon carbide and boron carbide. The filler may also be, for example, a porous aluminosilicate such as zeolite ($M_{2/n}O \cdot Al_2O_3 \cdot xSiO_2 \cdot yH_2O$, where M is a metal element, $x \geq 2$, and $y \geq 0$), a layered silicate such as talc ($Mg_3Si_4O_{10}(OH)_2$), or a mineral such as barium titanate ($BaTiO_3$) or strontium titanate ($SrTiO_3$).

To, for example, improve the heat resistance, the content of the filler in the heat-resistant layer 32 is preferably 20% by mass or higher and preferably 50% by mass or higher. The upper limit value is not particularly limited and is preferably 90% by mass or lower and more preferably 80% by mass or lower.

The thickness of the heat-resistant layer 32 is, for example, preferably 5 μm or less, more preferably from 1 μm to 5 μm, and, in particular, more preferably from 1 μm to 4 μm.

Examples of the binder contained in the heat-resistant layer 32 include polyethylene, polypropylene, copolymers of polyethylene and α-olefins and other polyolefins, PVdF, PTFE, polyvinyl fluoride (PVF), and other fluorine-containing resins, vinylidene fluoride-hexafluoropropylene-tetrafluoroethylene copolymers, ethylene-tetrafluoroethylene copolymers, and other fluorine-containing rubbers, styrene-butadiene copolymers and hydrides thereof, acrylonitrile-butadiene copolymers and hydrides thereof, acrylonitrile-butadiene-styrene copolymers and hydrides thereof, methacrylate-acrylate copolymers, styrene-acrylate copolymers, acrylonitrile-acrylate copolymers, polyvinyl acetate, polyphenylene ether, polysulfone, polyether sulfone, polyphenylene sulfide, polyetherimide, polyamideimide, polyamide, poly-N-vinylacetamide, polyester, polyacrylonitrile, cellulose, ethylene-vinyl acetate copolymers, polyvinyl chloride, isoprene rubbers, butadiene rubbers, polymethyl acrylate, polyethyl acrylate, polyvinyl alcohol, CMC, acrylamide, PVA, methyl cellulose, guar gum, sodium alginate, carageenan, xanthan gum, and salts thereof.

To, for example, increase the mechanical strength and adhesion of the heat-resistant layer 32, the content of the binder in the heat-resistant layer 32 is preferably 1% by mass or higher and more preferably 2% by mass or higher. The upper limit is not particularly limited and is, for example, preferably 20% by mass or lower and more preferably 10% by mass or lower.

The heat-resistant layer 32 is, for example, formed by applying slurry containing, for example, a filler and a binder to a surface of the substrate layer 30 and drying the coating. The slurry may be applied by any conventionally known method, such as gravure printing.

Non-Aqueous Electrolyte

The non-aqueous electrolyte includes a non-aqueous solvent and an electrolyte salt dissolved in the non-aqueous solvent. Examples of the non-aqueous solvent include esters, ethers, nitriles such as acetonitrile, amides such as dimethylformamide, and mixed solvents of two or more thereof. The non-aqueous solvent may contain a halogen substitution product in which at least one hydrogen atom of the solvent is substituted with a halogen atom, such as fluorine.

Examples of the esters include cyclic carbonate esters such as ethylene carbonate (EC), propylene carbonate (PC), and butylene carbonate, chain carbonate esters such as dimethyl carbonate (DMC), ethyl methyl carbonate (EMC), diethyl carbonate (DEC), methyl propyl carbonate, ethyl propyl carbonate, and methyl isopropyl carbonate, cyclic carboxylate esters such as γ-butyrolactone (GBL) and γ-valerolactone (GVL), and chain carboxylate esters such as methyl acetate, ethyl acetate, propyl acetate, methyl propionate (MP), ethyl propionate, and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

As the halogen substitution product, a fluorinated cyclic carbonate ester such as fluoroethylene carbonate (FEC), a fluorinated chain carbonate ester, and a fluorinated chain carboxylate ester such as methyl fluoropropionate (FMP) are preferably used.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})x$ (where $1<x<6$, and n is 1 or 2), $LiB_{10}Cl_{10}$, LiCl, LiBr, LiI, lithium chloroborane, lithium lower aliphatic carboxylates, borates such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ {where 1 and m are integers of 0 or greater}. One of these lithium salts may be used alone, or two or more of these lithium salts may be used as a mixture. Among these, $LiPF_6$ is preferably used in terms of, for example, ionic conductivity and electrochemical stability. The concentration of the lithium salt is preferably 0.8 to 1.8 mol per liter of the non-aqueous solvent.

EXAMPLES

The present disclosure will be further described below with reference to examples, but the present disclosure is not limited to these examples.

Example 1

Preparation of Resin-Coated Particles

The surfaces of copper particles having a particle size of 5 μm were coated with a low density polyethylene resin using a high-speed airflow impact method to form a polyethylene layer having a thickness of 3 μm. The resulting particles were used as the resin-coated particles.

Preparation of Positive Electrode

In an N-methylpyrrolidone (NMP) solvent, $LiNi_{0.8}Co_{0.15}Al_{0.05}O_2$ serving as the positive electrode active material, carbon black serving as the conductive material, PVDF (with an average molecular weight of 1,100,000) serving as the binder, and the above-described resin-coated particles were mixed in a mass ratio of 90:2.5:2.5:5 to prepare positive electrode mixture slurry with the solid content of 70%. This positive electrode mixture slurry was applied to both sides of a positive electrode collector consisting of aluminum foil, and the coating was dried and then rolled using a rolling mill to prepare a positive electrode having a positive electrode mixture layer on both sides of the positive electrode collector.

Preparation of Negative Electrode 95 parts by mass of graphite powder serving as the negative electrode active material, 5 parts by mass of a Si oxide serving as the negative electrode active material, 1 part by mass of carboxymethyl cellulose (CMC), and an appropriate amount of water were mixed. To this mixture, 1.2 parts by mass of styrene-butadiene rubber (SBR) and an appropriate amount of water were added and mixed to prepare negative electrode mixture slurry. This negative electrode mixture slurry was applied to both sides of a negative electrode collector consisting of copper foil, and the coating was dried and then rolled using a rolling mill to prepare a negative electrode having a negative electrode mixture layer on both sides of the negative electrode collector.

Formulation of Liquid Electrolyte

To 100 parts by mass of a mixed solvent consisting of ethylene carbonate (EC) and dimethyl carbonate (DMC) (with the volume ratio of EC:DMC=1:3), 5 parts by mass of vinylene carbonate (VC) was added, and 1 mole/liter of lithium hexafluorophosphate ($LiPF_6$) was further dissolved to prepare a liquid electrolyte.

Preparation of Separator

Alumina ($Al_2O_3$) having a particle size of 0.5 μm, carboxymethyl cellulose (CMC), styrene-butadiene rubber (SBR), and water were mixed in a mass ratio of 30:3:0.2:66.8 to prepare slurry. One of the surfaces of polyethylene microporous film (with a thickness of 16 μm, a Gurley value of 156 s/100 mL, and a pore size of 0.06 μm) serving as the substrate layer was coated with the above-described slurry by a gravure process, and then the coating was dried to remove the water content to prepare a separator having a heat-resistant layer on one of the surfaces of the substrate layer. The thickness of the heat-resistant layer was 2 μm.

Preparation of Non-Aqueous Electrolyte Secondary Battery

A lead terminal was attached to each of the above-described positive electrode and the above-described negative electrode, and then the positive electrode and the negative electrode were wound with the above-described separator interposed therebetween so as to have the heat-resistant layer of the separator opposed to the positive electrode to prepare a wound electrode assembly. This electrode assembly was placed in a case body, the lead terminal attached to the negative electrode was welded to the bottom of the case body, and the lead terminal attached to the positive electrode was welded to the sealing structure. Subsequently, the case body was filled with the above-described liquid electrolyte, and then the case body was hermetically sealed by the sealing structure to prepare a non-aqueous electrolyte secondary battery. The battery capacity of the prepared non-aqueous electrolyte secondary battery was 2500 mAh.

Example 2

In the preparation of the resin-coated particles, the surfaces of copper particles having a particle size of 10 μm were coated with a low density polyethylene resin using a high-speed airflow impact method to form a polyethylene layer having a thickness of 3 μm. A non-aqueous electrolyte secondary battery was prepared in a similar manner to Example 1 except that the resulting particles were used as the resin-coated particles.

Example 3

In the preparation of the resin-coated particles, the surfaces of copper particles having a particle size of 50 μm were coated with a low density polyethylene resin using a high-speed airflow impact method to form a polyethylene layer having a thickness of 3 μm. A non-aqueous electrolyte secondary battery was prepared in a similar manner to Example 1 except that the resulting particles were used as the resin-coated particles.

Comparative Example 1

A non-aqueous electrolyte secondary battery was prepared in a similar manner to Example 1 except that the resin-coated particles prepared in Example 2 were used, and that polyethylene microporous film (with a thickness of 16 μm, a Gurley value of 156 s/100 mL, and a pore size of 0.06 μm) on which the heat-resistant layer was not formed was used as the separator.

Comparative Example 2

A non-aqueous electrolyte secondary battery was prepared in a similar manner to Example 1 except that the resin-coated particles were not used.

Comparative Example 3

A non-aqueous electrolyte secondary battery was prepared in a similar manner to Example 1 except that the resin-coated particles were not used, and that polyethylene microporous film (with a thickness of 16 μm, a Gurley value of 156 s/100 mL, and a pore size of 0.06 μm) on which the heat-resistant layer was not formed was used as the separator.

Comparative Example 4

In the preparation of the resin-coated particles, the surfaces of copper particles having a particle size of 1 μm were coated with a low density polyethylene resin using a high-speed airflow impact method to form a polyethylene layer having a thickness of 3 μm. A non-aqueous electrolyte secondary battery was prepared in a similar manner to Example 1 except that the resulting particles were used as the resin-coated particles.

Example 4

In the preparation of the resin-coated particles, the surfaces of zinc particles having a particle size of 10 μm were coated with a low density polyethylene resin using a high-speed airflow impact method to form a polyethylene layer having a thickness of 3 μm. A non-aqueous electrolyte secondary battery was prepared in a similar manner to Example 1 except that the resulting particles were used as the resin-coated particles.

Example 5

A non-aqueous electrolyte secondary battery was prepared in a similar manner to Example 1 except that, in the preparation of the positive electrode, a positive electrode active material, a conductive material, a binder, and the resin-coated particles prepared in Example 2 were mixed in a mass ratio of 94.5:2.5:2.5:0.5.

Comparative Example 5

A non-aqueous electrolyte secondary battery was prepared in a similar manner to Example 1 except that, in the preparation of the positive electrode, a positive electrode active material, a conductive material, a binder, and the resin-coated particles prepared in Example 2 were mixed in a mass ratio of 94.9:2.5:2.5:0.1.

Comparative Example 6

A non-aqueous electrolyte secondary battery was prepared in a similar manner to Example 1 except that, in the preparation of the positive electrode, a positive electrode active material, a conductive material, a binder, and the resin-coated particles prepared in Example 2 were mixed in a mass ratio of 85:2.5:2.5:10.

Example 6

In the preparation of the resin-coated particles, the surfaces of tin particles having a particle size of 10 μm were coated with a low density polyethylene resin using a high-speed airflow impact method to form a polyethylene layer having a thickness of 3 μm. A non-aqueous electrolyte secondary battery was prepared in a similar manner to Example 1 except that the resulting particles were used as the resin-coated particles.

Heating Tests

Under an environment of 25° C., the batteries of the examples and the comparative examples underwent constant current charging at a current of 0.3 C (750 mA) to a battery voltage of 4.2 V and subsequently underwent constant voltage charging at a constant voltage of 4.2 V to a current value of 1/20 C (125 mA). The charged batteries were left at rest in a thermostat chamber, and the temperature within the thermostat chamber was heated to 150° C. Subsequently, the battery temperature at a battery side surface portion was measured to determine the number of degrees Celsius by which the temperature was higher than the temperature of the thermostat chamber (overshoot). The results are given in Table 1.

TABLE 1

| | RESIN-COATED PARTICLES | | | | |
|---|---|---|---|---|---|
| | METAL-BASED PARTICLES | | | | |
| | TYPE OF METAL | PARTICLE DIAMETER (μm) | CONTENT (wt %) | SEPARATOR | OVERSHOOT |
| Example 1 | Cu | 5 | 5 | PE film + $Al_2O_3$ layer | +2° C. |
| Example 2 | Cu | 10 | 5 | PE film + $Al_2O_3$ layer | +3° C. |
| Example 3 | Cu | 50 | 5 | PE film + $Al_2O_3$ layer | +5° C. |
| Comparative Example 1 | Cu | 10 | 5 | PE film | +25° C. |
| Comparative Example 2 | — | — | — | PE film + $Al_2O_3$ layer | +15° C. |
| Comparative Example 3 | — | — | — | PE film | +26° C. |
| Comparative Example 4 | Cu | 1 | 5 | PE film + $Al_2O_3$ layer | +18° C. |
| Example 4 | Zn | 10 | 5 | PE film + $Al_2O_3$ layer | +4° C. |
| Example 5 | Cu | 10 | 0.5 | PE film + $Al_2O_3$ layer | +3° C. |
| Comparative Example 5 | Cu | 10 | 0.1 | PE film + $Al_2O_3$ layer | +16° C. |
| Comparative Example 6 | Cu | 10 | 10 | PE film + $Al_2O_3$ layer | +21° C. |
| Example 6 | Sn | 10 | 5 | PE film + $Al_2O_3$ layer | +4° C. |

Referring to Example 2 and Comparative Example 1, in which the positive electrode mixture layer contained 5% by mass of the resin-coated particles with copper particles having a particle size of 10 μm coated with a polyethylene resin, the overshoot temperature was suppressed to be low in Example 2 in which the separator including the heat-resistant layer and the substrate layer was used, but the overshoot temperature in Comparative Example 1 in which only the substrate layer, without the heat-resistant layer, was used as the separator was significantly higher than in Example 2. In other words, Example 2 suppressed an increase in battery temperature of a non-aqueous electrolyte secondary battery exposed to a high-temperature environment in a charged state. In Example 2, copper particles eluted from the positive electrode, and deposits that precipitated on the negative electrode caused micro-short circuits between the positive and negative electrodes. It is believed that as a result, the energy of the battery was gradually lowered, and the overshoot temperature was suppressed to be low. In contrast, although deposits that precipitated on the negative electrode caused short circuits between the positive and negative electrodes in Comparative Example 1 as well, because the separator that did not include the heat-resistant layer was used, the separator melted due to a short circuit current that flowed between the positive and negative electrodes when short circuiting occurred, resulting in a greater short circuit area between the positive and negative electrodes. It is inferred that as a result, because the short circuit current increased, the battery generated heat, and the overshoot temperature increased.

Also, in Comparative Example 2 in which the positive electrode mixture layer did not contain the resin-coated particles, and in which the separator including the heat-resistant layer and the substrate layer was used, the overshoot temperature was higher than in Example 2. When, as in Comparative Example 2, the resin-coated particles are absent, because micro-short circuits do not occur between the positive and negative electrodes, the battery is kept at a high temperature when it is at a high voltage. It is inferred that as a result, the positive electrode generated heat, and the overshoot temperature increased.

The overshoot temperature was suppressed to be low in Example 1 in which the positive electrode mixture layer contained 5% by mass of the resin-coated particles with copper particles having a particle size of 5 μm coated with a polyethylene resin, but the overshoot temperature in Comparative Example 4 in which the positive electrode mixture layer contained 5% by mass of the coating resin with copper particles having a particle size of 1 μm coated with a polyethylene resin was higher than in Example 1. When, as in Example 1, copper particles have a large particle size, copper particles elute from the positive electrode, and deposits that precipitate on the negative electrode cause micro-short circuits between the positive and negative electrodes, but when, as in Comparative Example 4, copper particles have a small particle size that is 1 μm or smaller, because deposits that precipitate on the negative electrode are unable to grow to reach the positive electrode and micro-short circuits do not occur between the positive and negative electrodes, the battery is kept at a high temperature when it is at a high voltage. It is inferred that as a result, in Comparative Example 4, the positive electrode generated heat, and the overshoot temperature increased.

The overshoot temperature was suppressed to be low in Example 5 in which the positive electrode mixture layer contained 0.5% by mass of the resin-coated particles with copper particles having a particle size of 5 μm coated with a polyethylene resin, but the overshoot temperature in Comparative Example 5 in which the positive electrode mixture layer contained 0.1% by mass of the coating resin with copper particles having a particle size of 5 μm coated with a polyethylene resin, and in Comparative Example 6 in which the positive electrode mixture layer contained 10% by mass of the coating resin with copper particles having a particle size of 5 μm coated with a polyethylene resin, was higher than in Example 5 (and Example 1). When, as in Comparative Example 5, the content of the resin-coated particles is as low as 0.1% by mass, deposits cause micro-short circuits between the positive and negative electrodes at few locations, hampering efficient short circuiting. As such, the battery is kept at a high temperature when it is at a high voltage. It is inferred that as a result, in Comparative Example 5, the positive electrode generated heat, and the overshoot temperature increased. Further, when, as in Comparative Example 6, the content of the resin-coated particles is as high as 10% by mass or higher, deposits cause micro-short circuits between the positive and negative electrodes at too many locations, increasing the short circuit current. It is inferred that as a result, in Comparative Example 6, the battery generated heat, and the overshoot temperature increased.

The overshoot temperature was suppressed to be low in Example 4 in which the positive electrode mixture layer contained 5% by mass of the resin-coated particles with zinc particles having a particle size of 10 μm coated with a polyethylene resin, and in Example 6 in which the positive electrode mixture layer contained 5% by mass of the resin-coated particles with tin particles having a particle size of 10 μm coated with a polyethylene resin, in a similar manner to other examples in which copper particles were used. In Examples 4 and 5 as well, zinc particles or tin particles eluted from the positive electrode, and deposits that precipitated on the negative electrode caused micro-short circuits between the positive and negative electrodes. It is believed that as a result, the energy of the battery was gradually lowered, and the overshoot temperature was suppressed to be low. As described above, the overshoot temperature can be suppressed to be low when metal-based particles that elute at 4.3 V (vs. Li/Li$^+$) or less are used as the metal-based particles included in the resin-coated particles. Other than the metal-based particles used in the examples, metal-based particles that elute at 4.3 V (vs. Li/Li$^+$) or less include particles of $SnSO_4$, $SnCl_4$, Bi, $Bi_2(SO_4)_3$, $BiCl_3$, $ZnCl_2$, $ZnSO_4$, Co, $Ag_2O$, Pb, $PbCl_2$, Fe, and $Fe_2O_3$, for which it should also be noted that results of tests similar to the examples confirmed that the overshoot temperature was suppressed to be low.

REFERENCE SIGNS LIST

10 NON-AQUEOUS ELECTROLYTE SECONDARY BATTERY
11 POSITIVE ELECTRODE
12 NEGATIVE ELECTRODE
13 SEPARATOR
14 ELECTRODE ASSEMBLY
15 BATTERY CASE
16 CASE BODY
17 SEALING STRUCTURE
18, 19 INSULATING PLATE
20 POSITIVE ELECTRODE LEAD
21 NEGATIVE ELECTRODE LEAD
22 PROTRUSION
23 FILTER
24 LOWER VALVE ELEMENT
25 INSULATING MEMBER
26 UPPER VALVE ELEMENT
27 CAP
28 GASKET
30 SUBSTRATE LAYER
32 HEAT-RESISTANT LAYER

The invention claimed is:

1. A non-aqueous electrolyte secondary battery comprising:
an electrode assembly comprising a positive electrode, a negative electrode, and a separator, the separator comprising a heat-resistant layer and a substrate layer that are disposed between the positive electrode and the negative electrode; and
a non-aqueous electrolyte,
wherein the positive electrode comprises a positive electrode mixture layer that contains a positive electrode active material and resin-coated particles including metal-based particles coated with a resin that melts at 100° C. to 150° C.,
wherein the metal-based particles comprise at least either of metal particles and metal compound particles that elute into the non-aqueous electrolyte at 4.3 V (vs. Li/Li$^+$) or less,
wherein the metal-based particles have an average particle size of greater than 1 μm, and the content of the resin-coated particles is from 0.5% by mass to less than 10% by mass relative to the total amount of the positive electrode mixture layer, and
wherein the heat-resistant layer contains a filler and a binder.

2. The non-aqueous electrolyte secondary battery according to claim 1, wherein the metal-based particles have an average particle size of from 5 μm to 50 μm.

3. The non-aqueous electrolyte secondary battery according to claim 1, wherein the resin that covers the metal-based particles has a thickness of from 0.05 μm to 10 μm.

4. The non-aqueous electrolyte secondary battery according to claim 1, wherein the metal-based particles comprise metal particles of at least one of Cu, Sn, and Zn.

* * * * *